US010079943B2

(12) United States Patent
Wijetunge et al.

(10) Patent No.: US 10,079,943 B2
(45) Date of Patent: Sep. 18, 2018

(54) METHOD AND SYSTEM FOR DETECTING ANOMALIES IN CONSUMPTION OF DATA AND CHARGING OF DATA SERVICES

(71) Applicant: CELLOS SOFTWARE LIMITED, Melbourne, Victoria (AU)

(72) Inventors: Sumudu Prasad Wijetunge, Berwick (AU); Maheedhar Bose Juvva, Vijayawada (IN)

(73) Assignee: CELLOS SOFTWARE LIMITED, Melbourne (AU)

( * ) Notice: Subject to any disclaimer, the term of this patent is extended or adjusted under 35 U.S.C. 154(b) by 0 days.

(21) Appl. No.: 15/837,345

(22) Filed: Dec. 11, 2017

(65) Prior Publication Data

US 2018/0183939 A1 Jun. 28, 2018

(30) Foreign Application Priority Data

Dec. 23, 2016 (IN) .............................. 201621044108

(51) Int. Cl.
*H04M 15/00* (2006.01)
*H04W 4/24* (2018.01)

(52) U.S. Cl.
CPC ........... *H04M 15/73* (2013.01); *H04M 15/58* (2013.01); *H04M 15/60* (2013.01); *H04M 15/8214* (2013.01); *H04W 4/24* (2013.01); *H04M 15/41* (2013.01)

(58) Field of Classification Search
CPC ................. H04M 15/00; H04M 15/41; H04M 2215/0164; H04M 15/43; H04M 15/58; H04M 15/8228; H04M 2215/782; H04L 12/1428; H04L 12/1403; H04L 12/14; H04L 12/1482; H04W 4/24
See application file for complete search history.

(56) References Cited

U.S. PATENT DOCUMENTS

| 7,085,360 | B1 | 8/2006 | Sprouse |
| 7,440,557 | B2 | 10/2008 | Gunderman, Jr. |
| 8,078,509 | B2 | 12/2011 | Ye |
| 8,165,932 | B2 | 4/2012 | Schweitzer et al. |
| 9,749,840 | B1* | 8/2017 | Damle .................... H04W 8/18 |

(Continued)

FOREIGN PATENT DOCUMENTS

WO 2015094079 A1 6/2015

*Primary Examiner* — Nam Huynh
(74) *Attorney, Agent, or Firm* — Dilworth IP, LLC

(57) ABSTRACT

System and method for detecting anomalies in the recorded consumption of data volume and charging of data services in a communication network is described. Data records for each session may be captured from multiple sources. The data records may comprise parameters indicating usage volume pertaining to services being consumed for each session. Further, the data records may be aggregated and reconciled to detect volume gap in each session. Each session may be categorized into a session category based upon the detection of the volume gap. The data records may further be enriched by tagging each data record with the session category. The data records enriched may then be aggregated across the parameters. Finally, a root-cause parameter for the volume gap pertaining to each session may be identified by computing a total volume, a total volume gap and a probability of gap root-cause for each parameter using the aggregated data records.

14 Claims, 4 Drawing Sheets

(56) References Cited

U.S. PATENT DOCUMENTS

| | | |
|---|---|---|
| 2006/0206941 A1 | 9/2006 | Collins |
| 2009/0076866 A1 | 3/2009 | Zoldi et al. |
| 2010/0131526 A1 | 5/2010 | Sun et al. |
| 2011/0010225 A1 | 1/2011 | Varadarajan et al. |
| 2012/0221445 A1 | 8/2012 | Sharma |
| 2013/0169216 A1* | 7/2013 | Tsubouchi ............... H02J 7/00 320/107 |
| 2014/0024340 A1 | 1/2014 | Raleigh |
| 2014/0058908 A1 | 2/2014 | Gupta et al. |
| 2014/0293807 A1 | 10/2014 | Devolites et al. |
| 2015/0189097 A1 | 7/2015 | Sharma et al. |

* cited by examiner

METHOD AND SYSTEM FOR DETECTING ANOMALIES IN CONSUMPTION OF DATA AND CHARGING OF DATA SERVICES

CROSS-REFERENCE TO RELATED APPLICATIONS AND PRIORITY

The present application does claim priority from the India patent application number 201621044108 filed on 23 Dec. 2016.

TECHNICAL FIELD

The present disclosure, in general, relates to monitoring and analyzing large amount of data packets from high speed traffic flows in a data network, and more particularly to a method and system for detecting anomalies in data volume captured pertaining to consumption of services.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Telecom operators have a complex order-to-cash value chain cutting across multiple systems and processes. Telecom services are one of the highly-digitized industries with networks generating humongous volume of data from multiple complex systems in a matter of a few minutes. Independent and comprehensive analysis of all the data is indispensable to assure all usage on network is reported in charging systems accurately. Such a comprehensive analysis of terabytes of data is neither possible by means of human surveillance nor by means of using conventional computing mechanisms.

A typical telecom operation consists of a long and complex chain of interrelated operations that work together to deliver telecommunication services to customers and then track the services delivered and bill the customers for the services delivered. As the set of technologies and business processes grow bigger and more complex, the chance of failure increases in each of its connections. Staying competitive in the telecommunications industry requires delivering quality voice and data services, responding rapidly to market demands, and maximizing revenues without affecting the underlying network. But to achieve these goals, a company must integrate large volumes of data in multiple formats from a wide range of systems—all while juggling technological changes such as 3G expansion and 4G/LTE network rollout and consolidation.

Revenue leakage or Data leakage is a big challenge faced by the telecom operators today. A revenue leakage caused due to data discrepancies is typically attributed to when a telecom operator is unable to bill correctly for a given service or to receive the correct payment due to several reasons. As the network grows the probability of such leakages only increase. Though there are a few systems that have been proposed for monitoring data and revenue leakage by using different algorithms, however, such systems are either possible only theoretically or require adding additional load on various network elements which is not desirable by any network operator. Moreover, it is very difficult for a network administrator to trace out a fraudulent user among the various users of the telecom network or a faulty network node or policy that may lead to data leakage.

Therefore, there is a long-standing need for a system and method to automatically capture subscriber usage data from the network independently without interfering with the operator's core network and reconcile such data with the data recorded by various nodes in the network, and charging systems to find out the revenue gaps and possible root-cause of the gaps which will help in measuring and minimizing the leakage.

SUMMARY

This summary is provided to introduce concepts related to method and system for detecting anomalies in recorded consumption of data in a communication network and the concepts are further described below in the detailed description. This summary is not intended to identify essential features of the claimed subject matter nor is it intended for use in determining or limiting the scope of the claimed subject matter.

In an example embodiment, a method for detecting anomalies in recorded consumption of data in a communication network is described. The method may comprise extracting, by a processor, a plurality of data records from a plurality of data sources for each session in the communication network. The plurality of data sources may include at least a data extraction platform communicatively coupled to one or more controlling interfaces of the communication network for extracting one or more of the plurality of data records. The plurality of data records may comprise one or more parameters indicating usage volume pertaining to one or more services being consumed for each session. The method may further comprise aggregating, by the processor, the usage volume captured in the plurality of data records in order to obtain an aggregate usage volume corresponding to each data source for each session. The method may further comprise reconciling, by the processor, the aggregate usage volumes corresponding to each data source for each session in order to determine either presence or absence of a volume gap in each session. The method may further comprise categorizing, by the processor, each session into a session category based upon the determination of either presence or absence of the volume gap. The method may further comprise tagging, by the processor, the data records of a session with a session category corresponding to the session in order to obtain enriched data records for each session. The method may further comprise aggregating, by the processor, the enriched data records from the multiple data sources across the multiple parameters for each session. The method may further comprise computing, by the processor, a total volume and a probability of gap root-cause corresponding to each parameter for detecting an anomaly in the data volume captured by each parameter, wherein the total volume and the probability of gap root-cause is computed for each parameter based upon the enriched data records aggregated for each session. The method may further comprise identifying at least one parameter amongst the multiple parameters as a root-cause parameter for the volume gap for each session based upon the probability of the gap root-cause computed corresponding to each parameter of the multiple parameters.

In another implementation, a system for detecting anomalies in recorded consumption of data in a communication network is described. The system may comprise a processor and a memory coupled with the processor. The processor may execute a plurality of modules stored in the memory. The plurality of modules may further comprise a data capturing module for capturing a plurality of data records from a plurality of data sources for each session in a communication network. The plurality of data sources may further include at least a data extraction platform communicatively coupled to one or more controlling interfaces of the communication network. The plurality of data sources may be configured for extracting one or more of the plurality of data records, and wherein the plurality of data records comprises one or more parameters indicating usage volume pertaining to one or more services being consumed for each session. The plurality of modules may further comprise a data aggregation and reconciliation module for aggregating the usage volume captured in the plurality of data records in order to obtain an aggregate usage volume corresponding to each data source for each session. The data aggregation and reconciliation module may further reconcile the aggregate usage volumes corresponding to each data source in order to determine either presence or absence of volume gap for each session. The plurality of modules may further comprise a data enrichment module for categorizing each session into a predefined session category based upon the determination of either presence or absence of the volume gap. The data enrichment module may further tag the data records of a session with the predefined session category corresponding to the session in order to obtain enriched data records for each session. The plurality of modules may further comprise a data analytics module for aggregating the enriched data records from the multiple data sources across the multiple parameters for each session. The data analytics module may further compute a total volume and a probability of gap root-cause corresponding to each parameter for detecting an anomaly in the data volume captured by each parameter, wherein the total volume and the probability of gap root-cause is computed for each parameter based upon the enriched data records aggregated for each session. The data analytics module may further identify at least one parameter amongst the multiple parameters as a root-cause parameter for the volume gap for each session based upon the probability of the gap root-cause computed corresponding to each parameter of the multiple parameters.

In yet another implementation, a non-transitory computer readable medium storing program for detecting anomalies in recorded consumption of data in a communication network is described. The program may further comprise instructions for extracting a plurality of data records from a plurality of data sources for each session in the communication network, wherein the plurality of data sources include at least a data extraction platform communicatively coupled to one or more controlling interfaces of the communication network for extracting one or more of the plurality of data records, and wherein the plurality of data records comprises one or more parameters indicating usage volume pertaining to one or more services being consumed for each session. The program may further comprise instructions for aggregating the usage volume captured in the plurality of data records in order to obtain an aggregate usage volume corresponding to each data source for each session. The program may further comprise instructions for reconciling the aggregate usage volumes corresponding to each data source in order to determine either presence or absence of volume gap for each session. The program may further comprise instructions for categorizing each session into a session category based upon the determination of either presence or absence of the volume gap. The program may further comprise instructions for tagging the data records of a session with the predefined session category corresponding to the session in order to obtain enriched data records for each session. The program may further comprise instructions for aggregating the enriched data records from the multiple data sources across the multiple parameters for each session. The program may further comprise instructions for computing a total volume and a probability of gap root-cause corresponding to each parameter for detecting an anomaly in the data volume captured by each parameter, wherein the total volume and the probability of gap root-cause is computed for each parameter based upon the enriched data records aggregated for each session. The program may further comprise instructions for identifying at least one parameter amongst the multiple parameters as a root-cause parameter for the volume gap for each session based upon the probability of the gap root-cause computed corresponding to each parameter of the multiple parameters.

BRIEF DESCRIPTION OF DRAWINGS

The detailed description is described with reference to the accompanying Figures. In the Figures, the left-most digit(s) of a reference number identifies the Figure in which the reference number first appears. The same numbers are used throughout the drawings to refer like features and components.

DETAILED DESCRIPTION

Figure 1:
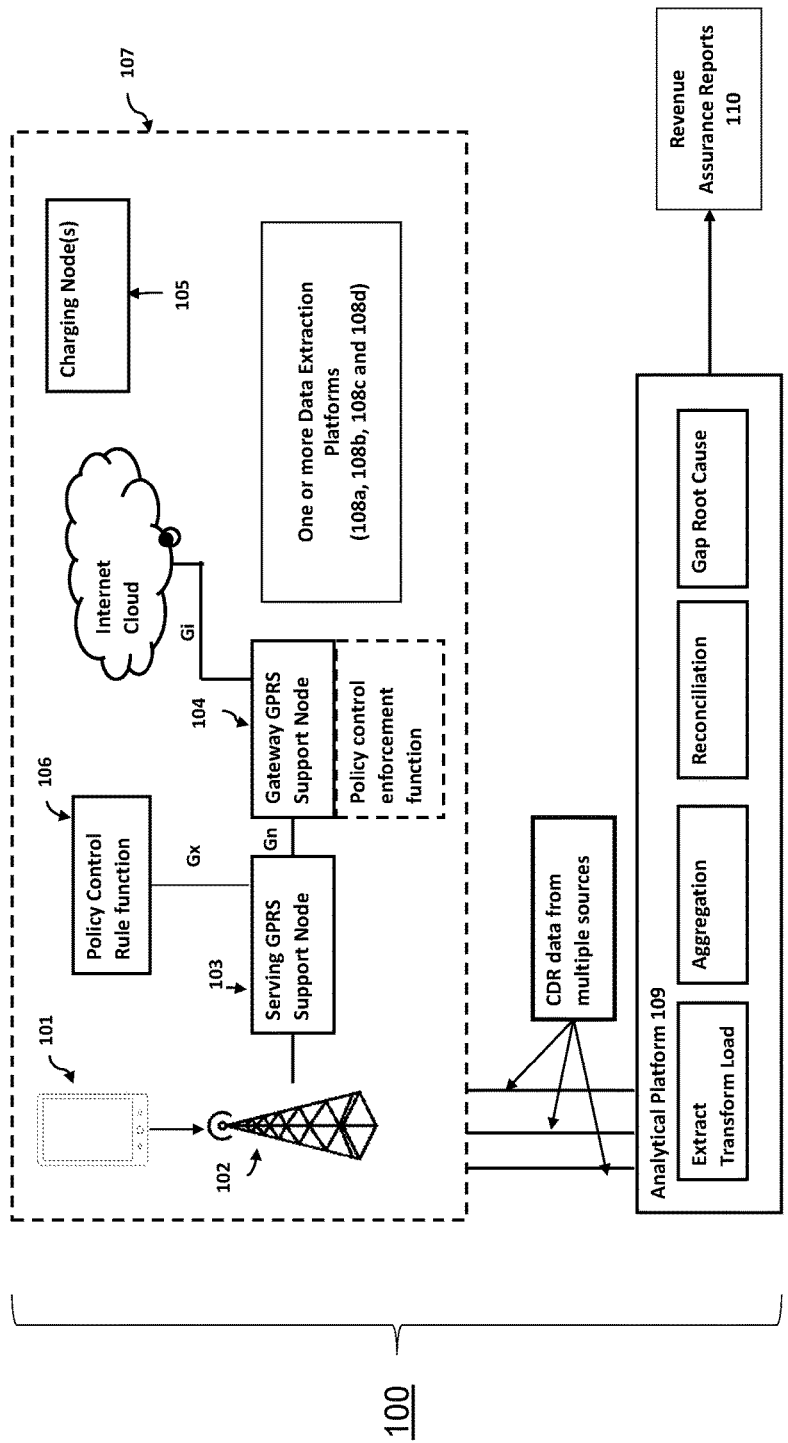
FIG. 1 illustrates a network implementation of system 100 for detecting anomalies in recorded consumption of data in a communication network 107, in accordance with an example embodiment of the present disclosure.

Method(s) and system(s) for detecting anomalies in recorded consumption of data in a communication network are described. An automated method and system are disclosed that facilitates to capture subscriber usage data from the network independently and to further reconcile such captured data with the usage data recorded by operator's network and charging systems in order to determine the data leakage, revenue gaps, and probable root-cause of the gaps occurred in the usage data there by enabling the telecom operators to measure and minimize usage gaps.

The system may enable the telecom operator to capture a plurality of data records from multiple data sources for each session in a communication network. The multiple data sources may comprise one or more data extraction platforms (DEP) or telecom probes, one or more network nodes and one or more charging nodes. In one embodiment, the plurality of data records may comprise a plurality of call detail records (CDRs) that are extracted from one or more network nodes and one or more charging nodes. Further, the plurality of data records may comprise a plurality of usage detail records (UDRs) extracted by the one or more data extraction platforms. Hereinafter, the call detail records (CDRs) and the usage detail records (UDRs) will be in general referred to as "data records". The data records may comprise parameters indicating usage volume consumed for each session along with various parameters for identifying a particular user's data session.

In an embodiment, the data extraction platform may be a monitoring probe device communicatively coupled to one or more controlling interfaces of the communication network. In an aspect, the monitoring probe may be a probe as described in U.S. Pat. No. 9,306,818 assigned to the current assignee which is incorporated by reference herein in its entirety. The data extraction platform may be abbreviated hereinafter as a "probe" or a "telecom probe" interchangeably in the present disclosure. The probe may extract traffic flows from different controlling interfaces including LTE interfaces such as LTE S11, S1-U, S1-MME, S3, S6a or S10 interfaces over 10 Gbps optical links. The LTE interfaces are defined in Third Generation Partnership Project (3GPP) Technical Specifications.

The data records captured are further aggregated corresponding to each data source for each session. The system may reconcile the aggregate usage volumes corresponding to each data source in order to determine either presence or absence of volume gap for each session. The aggregation and reconciliation process may enable to analyze and compute a total volume and a probability of gap root-cause corresponding to each parameter for detecting an anomaly in the data volume captured by each parameter.

While aspects of described system and method for detecting anomalies in recorded consumption of data in a communication network may be implemented in any number of different computing systems, environments, and/or configurations, the embodiments are described in the context of the following exemplary system. Moreover, though the present disclosure describes the method and system in a 3G network however it is to be understood that similar approach is valid for other networks such as 2G, 4G, 5G, and the like without deviating from the essential steps described herein.

Referring to FIG. 1, a network implementation of the system 100 for detecting anomalies in recorded consumption of data in a communication network 107 is illustrated, in accordance with an embodiment of the present subject matter. In one embodiment, the system may comprise a user device 101 which belongs to the client/customer and is the point of usage of data provided by the telecom operator. The user device 101 may be connected to the communication network 107 via a radio access network 102. Further, the system 100 may comprise data source nodes comprising a Serving GPRS Support Node 103, a Gateway GPRS Support Node 104, a charging node 105, a policy control rule function/node 106, and one or more data extraction platforms or DEPs (108a, 108b, 108c, and 108d). Further, the system 100 may comprise an analytical platform 109 for data extraction, aggregation, reconciliation, detection of gap root cause and thereby generate one or more revenue assurance reports 110.

In an embodiment, the analytical platform 109 may extract a plurality of data records from a plurality of sources including the one or more data extraction platforms (108a, 108b, 108c, and 108d) (hereinafter referred as a "probe 108" or "telecom probe 108" or "telecom probe node 108" interchangeably), the network nodes (103, 104) and the charging node 105. The telecom probe node 108 may be configured for extracting traffic from telecom network interfaces comprising Gn/Gp/S11/S1U/S4/S5/S8/Gx/Gy/Gi for 2.5G-4G traffic. Similarly, multiple such data records are captured from other data sources as described above corresponding to each session in the communication network 107. The telecom operator(s) may manage multiple network and business machines to provide services and to charge customers based upon consumption of the services by the customers. Furthermore, for charging data services, the telecom operators may employ additional systems to enforce Policy and Charging Enforcement Function (PCEF), apply Policy and Charging Rules Function rules (PCRF) for specific policies. The data recorded in these systems is critical to assure/audit revenues.

The system may be capable of supporting multiple traffic interfaces between the multiple nodes in 3G network. The multiple traffic interfaces include:

Gn—The interface between two GSNs (SGSN and GGSN) within the same public land mobile network (PLMN) in a GPRS/UMTS network.

Gp—The interface between two GSNs (roaming SGSN and GGSN) in different PLMNs. GTP is a protocol defined on the Gn/Gp interface. The GGSN is a network gateway that provides the network's view of the usage. The GGSN operates for the interworking between the GPRS network and external packet switched networks, like the Internet and X.25 networks.

Gx—The on-line policy interface between the GGSN and the charging rules function (CRF). The Gx interface may be used for provisioning service data flow based on charging rules and further uses the diameter protocol.

Gy is interface between Online Charging System (OCS) and PCEF/GGSN/PGW (Packed Data Network Gateway). Gy interface allows online credit control for service data flow based charging.

Gi—IP based interface between the GGSN and a public data network (PDN) either directly to the Internet or through a WAP gateway.

In an embodiment, the data records extracted from the telecom probe and the other sources of the operator's systems may be converted to a predefined format by the analytical platform 109. The analytical platform 109 may further implement the processes of aggregation, reconciliation and Gap-root cause analysis to generate revenue assurance reports, the details of which are further explained hereinafter as below.

Although the present subject matter is explained considering that the analytical platform 109 is implemented on a server, it may be understood that the analytical platform 109 may also be implemented in a variety of computing systems, such as a distributed system, a laptop computer, a desktop computer, a notebook, a workstation, a mainframe computer, a server, a network server, and using a variety of database software like-RDBMS (example—Oracle, Postgres), distributed file systems (example—MapR). Examples of the user devices 101 may include, but are not limited to, a portable computer, a personal digital assistant, a handheld device, and a workstation.

In one implementation, the network may be a wireless network, a wired network or a combination thereof. The network can be implemented as one of the different types of networks, such as intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

Figure 2:
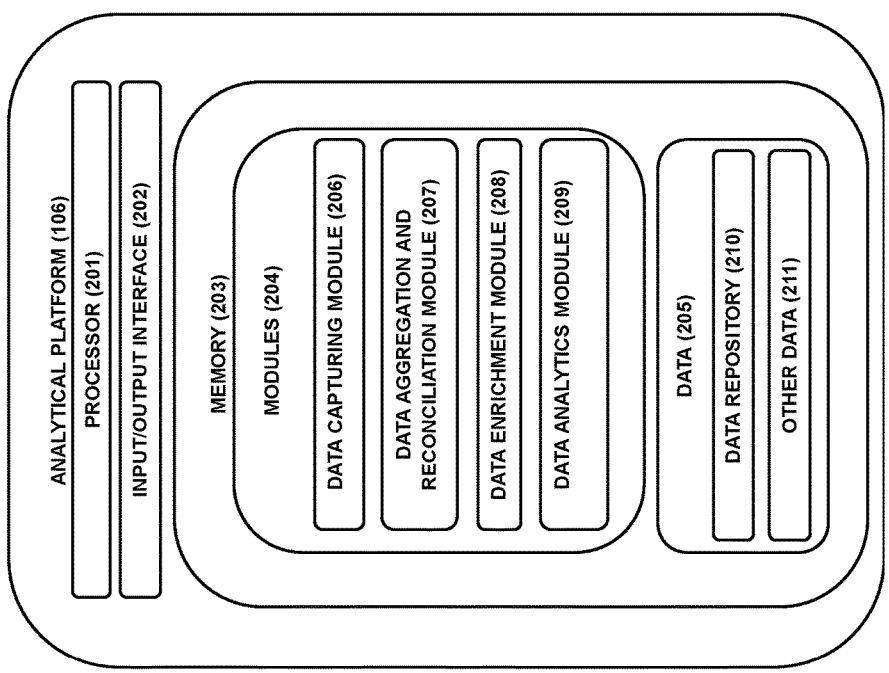
FIG. 2 illustrates an analytical platform 109 and its components collectively enabling the detection of the anomalies in recorded consumption of data in a communication network, in accordance with an embodiment of the present disclosure.

Referring now to FIG. 2, the analytical platform 109 is illustrated in accordance with an embodiment of the present subject matter. In one embodiment, the analytical platform 109 may include at least one processor 201, an input/output (I/O) interface 202, and a memory 203. The at least one processor 201 may be implemented as one or more microprocessors, microcomputers, microcontrollers, digital signal processors, central processing units, state machines, logic circuitries, and/or any devices that manipulate signals based on operational instructions. Among other capabilities, the at least one processor 201 is configured to fetch and execute computer-readable instructions stored in the memory 203.

The I/O interface 202 may include a variety of software and hardware interfaces, for example, a web interface, a graphical user interface, and the like. The I/O interface 202 may allow the analytical platform 109 to interact with a network administrator or a revenue assurance analyst using one or more devices such as a laptop computer, personal computer, smartphone, and the like. Further, the I/O interface 202 may enable the analytical platform 109 to communicate with other computing devices, such as web servers and external data servers (not shown). The I/O interface 202 can facilitate multiple communications within a wide variety of networks and protocol types, including wired networks, for example, LAN, cable, etc., and wireless networks, such as WLAN, cellular, or satellite. The I/O interface 202 may include one or more ports for connecting several devices to one another or to another server.

The memory 203 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 203 may include modules 204 and data 205.

The modules 204 include routines, programs, objects, components, data structures, etc., which perform particular tasks or implement particular abstract data types. In one implementation, the modules 204 may include a data capturing module 206, a data aggregation and reconciliation module 207, a data enrichment module 208, a data analytics module 209 and other modules. The other modules may include programs or coded instructions that supplement applications and functions of the analytical platform 109.

The data 205, amongst other things, serves as a repository for storing data processed, received, and generated by one or more of the modules 204. The data 205 may include data repository 210 and other data 211. The data repository 210 may include data records captured from multiple data sources for each session in a communication network. The other data 211 may include data generated as a result of the execution of one or more modules in the other modules. The telecom operator may manage multiple network and business machines to provide services and to charge the customers. The detailed functionality of the modules 204 are further described in reference with FIGS. 2, 3 and 4 as below.

Data Capturing Module 206

Figure 3:
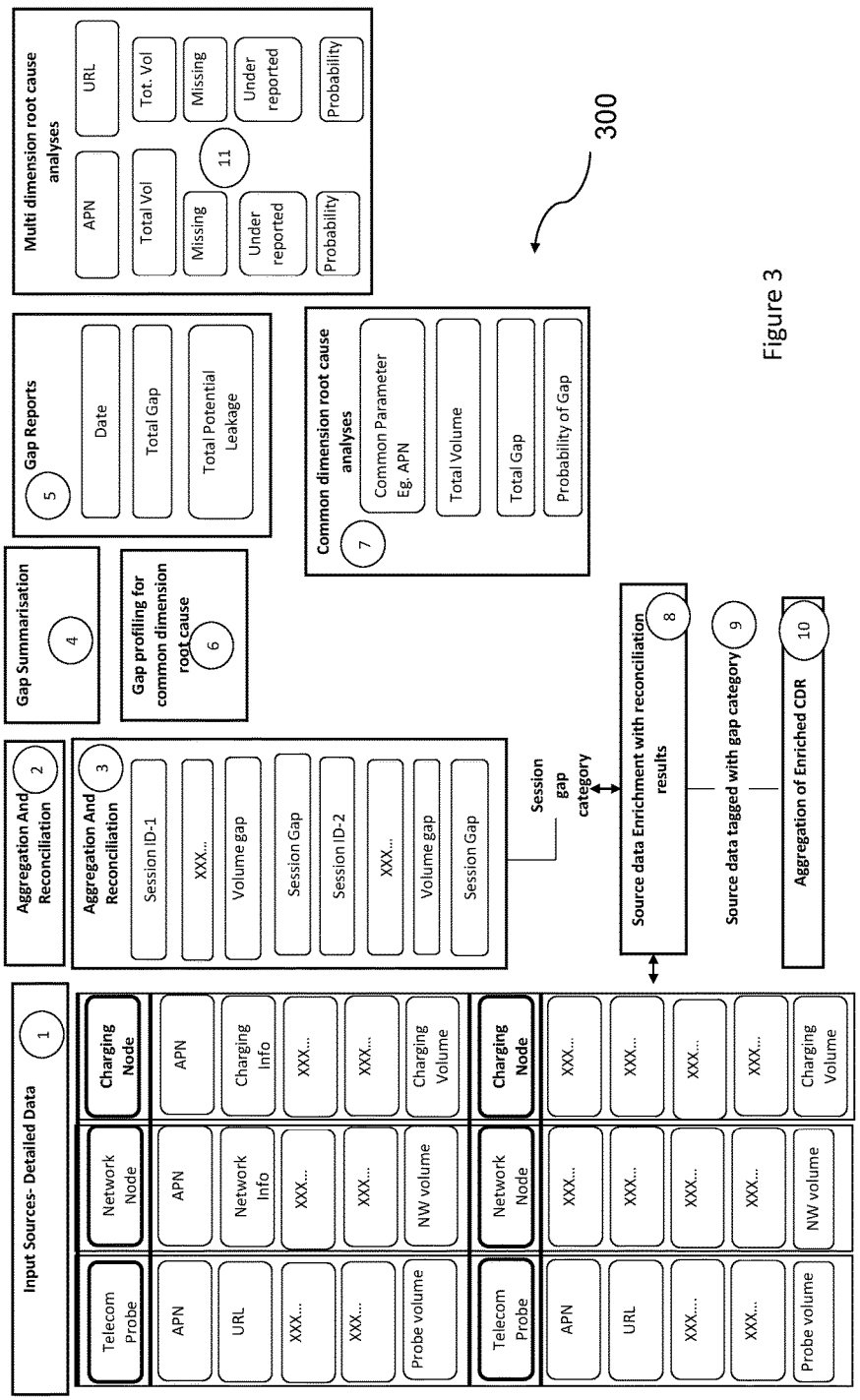
FIG. 3 illustrates a method 300 depicting steps performed by the analytical platform 109 for detecting the anomalies in recorded consumption of data in a communication network, in accordance with an embodiment of the present disclosure.

In an embodiment, the data capturing module 206 may enable the analytical platform 109 to capture the plurality of data records from multiple data sources for each session in a communication network. The data capturing module 206 may extract information of the plurality of usage detail records by probing various interfaces such as the common interface (e.g., S1-U interface) and the Gn interface. The data captured from the telecom probe is the source of data which may be compared with the data captured from other sources to identify session volume gaps. The analytical platform 109 may extract such data from multiple interfaces over 1 Gb/s copper and 10 Gb/s optical links. In accordance with embodiments of the present disclosure, the data records comprise parameters indicating usage volume pertaining to one or more services being consumed for each session. The multiple data sources may comprise one or more telecom probe nodes, one or more network nodes and one or more charging nodes. The charging node may belong to a telecom operator's charging system. The charging node may be a signal controlling node and further may be used in a communication network (such as a 3G or 4G mobile communication system) that can receive and process, track, and rate (assign a value to) packet data service and content usage requests. The charging node may further identify and communicate with a Session Description Protocol (SDP), perform session control, identify the correct device and account numbers (number portability), and create call detail records. In an example embodiment, the data records may comprise the plurality of the parameters including, but not limited to:

Access Point Name (APN): Name of a gateway between a GSM, GPRS, 3G, 4G mobile network and another computer network, configured in mobile handset.
Domain name
Proxy IP address: IP address of the intermediate server redirecting traffic from end-user
Protocol: Protocol being used by user e.g. SIP
Sub-protocol: Specific sub-protocol being used by user e.g.: ichat, SSL
Application: End user application being accessed by user e.g. Facetime
RAT type: Access technology—2.5G, UMTS, LTE etc. being used for data services, can change during a session
TAC: Initial eight-digit portion of the 15-digit IMEI for identification of handset model
Network node: Specific site or network node in operator's core packet network involved in the session
VPLMN: PLMN on which the mobile subscriber has roamed when leaving their HPLMN (Home Public Land Mobile Network).
Cell ID: Granular location identifier of mobile subscribers within a radio tower
Time Window: Time hour or slab (peak, off-peak) related to subscriber's data session
Rating Product: Categorization of the service being used by subscriber into products defined by marketing team
Destination IP address: Shortened domain name being accessed by user, e.g. google.com, google.co.in Referring now to FIG. 3, block 1 illustrates data of each data records captured from sources comprising the telecom probe node, network node and charging node. It is to be noted that the data records herein indicate multiple data records captured by multiple sources for multiple sessions. As illustrated in FIG. 3, block 1 indicates the data records captured pertaining to two session IDs; Viz. Session ID-1 and Session ID-2. The multiple data records captured may be stored in the data repository 210. The data repository 210 may comprise 'n' number of data records captured corresponding to n number of session IDs from multiple sources.

Figure 4:
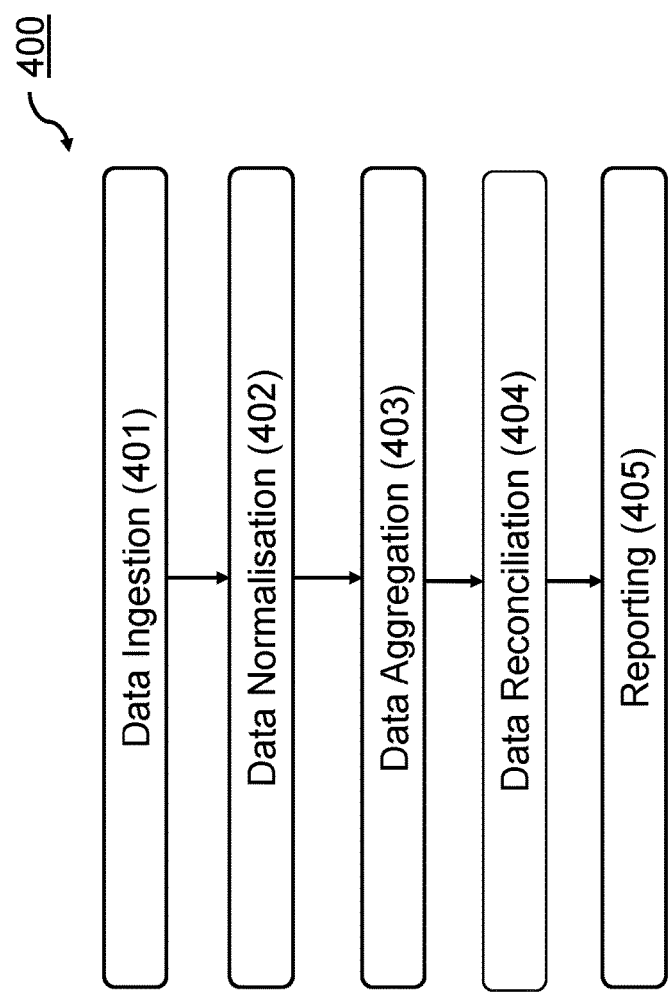
FIG. 4 illustrates a flow diagram 400 depicting various data processing and data analytics stages implemented by the analytical platform 109, in accordance with an embodiment of the present subject matter.

Referring now to FIG. 4 is a flow diagram 400 illustrating a data ingestion stage 401, a data normalization stage 402, a data aggregation stage 403, a data reconciliation stage 404 and a reporting stage 405 implemented by the analytical platform 109. The above data extraction steps are performed in the data ingestion stage 401 explained in detail hereinafter as below.

As shown in FIG. 4, in the data ingestion stage 401, the analytical platform 109 may extract data records from the telecom probe node, the network node and the charging node. In one embodiment, the data capturing module 206 of the analytical platform 109 may extract information about data sessions including MSISDN, Charging ID, UE IP, and volume by probing the controlling interface (e.g. S1-U interface for LTE) and Gn Interface. Furthermore, only the columns containing data that is relevant for further processing and analysis by the analytical platform 109 may be ingested into the data repository 210 from the telecom probe node (Data Extraction Platform), the charging node 105, and the network nodes (103, 104). In an embodiment, the data records are obtained from the operator's systems including the network charging nodes (103, 104) and Charging (CHG) for the same period during which the Data Extraction Platform (or the telecom probe) extracted the S1-U and Gn information. The data extracted from the telecom probe may be stored as Usage detail records (UDRs) whereas the data records extracted from the network nodes (103, 104) and the charging node 105 are stored as call detail records (CDRs) in the data repository 210. In some examples, UDRs such as usage detail records related to data consumed for email related services, usage detail records related to data consumed for Hypertext Transfer Protocol (HTTP) related services, usage detail records related to data consumed for Session Initiation Protocol (SIP) related services, usage detail records related to data consumed by one or more web applications, and the like may be created in the data repository 210.

Referring to FIG. 4, in data normalization stage 402, the analytical platform 109 may normalize the UDRs and CDRs based upon extracting, transforming and loading (ETL) framework. The data records extracted from the multiple sources is transferred to the analytical platform 109 in diverse formats and with different meanings. In some examples, the formats of the data may be machine readable such as ASN. 1, Binary and the like. It must be noted that correlation among the data sources and analysis requires common (ASCII) formats and definitions. Transformation and loading functions in the ETL framework cater to this requirement.

The first step in the ETL framework is to utilize transformation functions for converting any machine data to human readable format. Decoder programs for specific encoding syntax of source may be employed to convert the data into ASCII format. Once the data is converted in to ASCII format, transformation, enrichment rules may be applied for converting data into common data definition. In one example, all time stamps may be normalized to operator's time zone in a predefined format for comparison. The data thus extracted and transformed into common definition may further be loaded into analytical data store (e.g. the data repository 210) for analysis.

In an embodiment, the analytical platform 109 may normalize the UDRs and CDRs to generate one or more records such as normalized probe records, normalized network records, normalized charging records, and the like. Such records may be stored in the data repository 210 in form of a table or as any data structure that enables efficient processing and analysis.

In an embodiment, the multiple CDRs and/or UDRs may comprise multiple parameters indicating usage volume captured corresponding to each session. The multiple parameters may be identified as common parameters or uncommon parameters. The common parameters herein indicate the parameters that are captured by each of the multiple sources. Whereas, the uncommon parameters indicate the parameters that are captured by at least one of the multiple sources but not captured by at least one other source of the multiple sources.

In one embodiment, the parameters may be designated as the common parameters or the uncommon parameters based upon the parameters captured via the telecom probe node. That is at least one parameter captured by the telecom probe node which is also captured by the other sources (viz. the network node and the charging node) may be categorized as the common parameter. Whereas, at least one parameter captured by the telecom probe node but not captured by at least one of the other sources (i.e. the network node and the charging node) may be categorized as the uncommon parameter. Table 1 below illustrates commonality across different data sources in accordance with an embodiment of the present disclosure. As can be seen, the Table 1 comprises common and uncommon parameters further segregated into consistent and inconsistent parameters. It must be noted that the consistent parameters herein indicate parameters which remain consistent throughout a session. Whereas, the inconsistent parameters indicate the parameters which remain inconsistent throughout a session.

TABLE 1

Commonality amongst parameters captured via different sources

| | Consistency within session | |
|---|---|---|
| Commonality across data sources | Consistent parameter(s) | Inconsistent parameter(s) |
| Common parameter(s) | Access point name, VPLMN, Charging characteristic, Network node | RAT Type, Time window, Cell ID |
| Uncommon parameter(s) | IMEI TAC (Gn, CHG, optional in CHG) | Domain name (Gn), Application (Gn), Protocol (Gn), Sub-protocol (Gn), Proxy IP (Gn), Destination server IP, (Gn) Destination port(Gn), Rating product (NET, CHG) |

In an example, Tables 2-4 below illustrates sample data (UDRs/CDRs) captured from the telecom probe, the network node and the charging node corresponding to different sessions.

TABLE 2

Data records captured from telecom probe and charging node for session I

| | Session-I | | |
|---|---|---|---|
| Data Record attributes/parameters | Probe UDR-1 | Probe UDR-2 | Charging CDR-1 |
| MSISDN | +911234567890 | +911234567890 | +911234567890 |
| CHARGING_ID | 98765 | 98765 | 98765 |
| SESSION_START_TIME | 12:06:30 | 12:06:30 | 12:06:30 |
| Data Record_START_TIME | 12:06:30 | 12:06:30 | 12:06:30 |
| Data Record_END_TIME | 12:08:30 | 12:08:30 | 12:08:30 |
| SESSION_END_TIME | — | 12:08:30 | 12:08:30 |
| APN | wap.telco.com | wap.telco.com | wap.telco.com |
| GGSN_IP_ADDRESS | 51.61.71.81 | 51.61.71.81 | 51.61.71.81 |
| IMEI | 987654321012345 | 987654321012345 | 987654321012345 |
| TAC | 98765432 | 98765432 | 98765432 |
| VPLMN | 12345 | 12345 | 12345 |
| CHARGING_CHARACTGERISTIC | 400 | 400 | 400 |
| RAT_TYPE | 3G | 3G | 3G |
| PROTOCOL | HTTP_GOOGLE_TALK | HTTP | |
| SUB_PROTOCOL | VIDEO | GENERIC | |
| APPLICATION | GMAIL | FACEBOOK | |
| DOMAIN_NAME | gmail.com | 0.facebook.com | |
| PROXY_SERVER_IP_ADDRESS | 191.291.391.491 | 191.291.391.491 | |
| PROXY_IP_RANGE | 191.291. | 191.291. | |
| LAC | 78 | 78 | |
| CELL_ID | 45678 | 45678 | |
| RATING_PRODUCT | | | 1 |
| UPLINK_VOLUME | 3145728 | 1048576 | |
| DOWNLINK_VOLUME | 7340032 | 9437184 | |
| TOTAL_VOLUME | 10485760 | 10485760 | 10484711 |

TABLE 3

Data records captured from telecom probe and charging node for Session II

| | Session-II | | |
|---|---|---|---|
| Data Record attributes/parameters | Probe UDR-3 | Probe UDR-4 | Charging CDR-2 |
| MSISDN | +911234567891 | +911234567891 | +911234567891 |
| CHARGING_ID | 54321 | 54321 | 54321 |
| SESSION_START_TIME | 12:10:30 | 12:10:30 | 12:10:30 |
| Data Record_START_TIME | 12:10:30 | 12:10:30 | 12:11:30 |
| Data Record_END_TIME | 12:12:30 | 12:12:30 | 12:12:30 |
| SESSION_END_TIME | — | 12:12:30 | 12:12:30 |
| APN | internet.telco.com | internet.telco.com | internet.telco.com |
| GGSN_IP_ADDRESS | 51.61.71.81 | 51.61.71.81 | 51.61.71.81 |
| IMEI | 987654321012333 | 987654321012333 | 987654321012333 |
| TAC | 98765432 | 98765432 | 98765432 |
| VPLMN | 12345 | 12345 | 12345 |
| CHARGING_CHARACTGERISTIC | 400 | 400 | 400 |
| RAT_TYPE | 4G | 4G | 4G |
| PROTOCOL | HTTP | HTTP | |
| SUB_PROTOCOL | GENERIC | GENERIC | |
| APPLICATION | FACEBOOK | FACEBOOK | |
| DOMAIN_NAME | facebook.com | 0.facebook.com | |
| PROXY_SERVER_IP_ADDRESS | — | — | |
| PROXY_IP_RANGE | — | — | |
| LAC | 97 | 97 | |
| CELL_ID | 1234 | 1234 | |
| RATING_PRODUCT | | | 1 |
| UPLINK_VOLUME | 3145728 | 1048576 | |
| DOWNLINK_VOLUME | 17825792 | 7340032 | |
| TOTAL_VOLUME | 20971520 | 8388608 | 20971516 |

TABLE 4

Data records captured from telecom probe and charging node for session III

| | Session-III | | |
|---|---|---|---|
| Data record attributes | Probe UDR-5 | Probe UDR-6 | Charging CDR-3 |
| MSISDN | +911234598765 | +911234598765 | +911234598765 |
| CHARGING_ID | 98765 | 98765 | 98765 |
| SESSION_START_TIME | 12:16:20 | 12:16:20 | 12:17:20 |
| Data record_START_TIME | 12:16:20 | 12:16:20 | 12:17:20 |
| Data Record_END_TIME | 12:19:25 | 12:19:25 | 12:18:25 |
| SESSION_END_TIME | — | 12:19:25 | 12:18:25 |
| APN | wap.telco.com | wap.telco.com | wap.telco.com |
| GGSN_IP_ADDRESS | 51.61.71.81 | 51.61.71.81 | 51.61.71.81 |
| IMEI | 987654321012444 | 987654321012444 | 987654321012444 |
| TAC | 98765432 | 98765432 | 98765432 |
| VPLMN | 12345 | 12345 | 12345 |
| CHARGING_CHARACTGERISTIC | 400 | 400 | 400 |
| RAT_TYPE | 3G | 4G | 3G |
| PROTOCOL | HTTP_GOOGLE_TALK | HTTP | |
| SUB_PROTOCOL | VIDEO | GENERIC | |
| APPLICATION | GMAIL | FACEBOOK | |
| DOMAIN_NAME | gmail.com | facebook.com | |
| PROXY_SERVER_IP_ADDRESS | — | 191.291.391.491 | |
| PROXY_IP_RANGE | — | 191.291. | |
| LAC | 97 | 78 | |
| CELL_ID | 1234 | 45678 | |
| RATING_PRODUCT | | | 1 |
| UPLINK_VOLUME | 3145728 | 4194304 | |
| DOWNLINK_VOLUME | 12582912 | 22020096 | |
| TOTAL_VOLUME | 15728640 | 26214400 | 41943040 |

The Data records along with their parameters categorized as common and uncommon parameters may be further processed via the data aggregation and reconciliation module 207 (as shown in FIG. 2), the details of which are explained as below.

Data Aggregation And Reconciliation Module 207

Referring now to FIG. 2, the data aggregation and reconciliation module 207 may further enable the analytical platform 109 to aggregate the usage volume captured via the UDRs/CDRs, in order to obtain an aggregate usage volume corresponding to each data source for each session. The data recorded by operator's systems (e.g. the network nodes and the charging node) may facilitate monitoring network usage and charging the usage which are the key to revenue assurance. Data sessions, unlike voice calls, may last longer (up to weeks) in an always-on mode. Operator's network, charging systems may generate CDRs based on individual system definition and optimization, resulting in multiple partial CDRs for a single session.

It is to be noted that aggregation is the process of adding up multiple related UDRs/CDRs from each source comprising the network node, the charging node and the telecom probe node to prepare source wise summary records. The aggregation may be executed in many levels by using proper session identifier. The aggregation levels may further comprise IP-CAN session level, bearer level, and service data flow level. The detailed description of the aggregation and reconciliation is further explained in the data aggregation stage 403 and the data reconciliation stage 404 as illustrated in FIG. 4.

Referring now to FIG. 4, in the data aggregation stage 403, the analytical platform 109, via the data aggregation and reconciliation module 207, may aggregate the normalized data records pertaining to various sources, wherein the data records normalized are aggregated session wise on time-to-time basis. Such time-to-time based aggregation may be executed either daily or weekly or as per the specific requirements of the system. In order to avoid computational performance issues, the aggregation of an entire day's data may be performed in two steps.

Step 1->Pre-Aggregation: Data is aggregated at pre-determined intervals to generate multiple intra-day aggregates.

Step 2->End-of-day Aggregation: All the pre-aggregated data for the day is aggregated at the end of the day.

In an embodiment, all the partial CDRs and the UDRs from the normalized data records associated with a single data session may be aggregated into aggregated data records corresponding to the data extraction platforms, the network elements, and the charging nodes.

Referring to FIG. 4, in the data reconciliation stage 404, the analytical platform 109, via the data aggregation and reconciliation module 207, may reconcile the data pertaining to a plurality of CDRs/UDRs belonging to each session. The reconciliation process is further explained in detail hereinafter.

The data aggregation and reconciliation module 207 may use the aggregation records including aggregate data records corresponding to the data extraction platforms, aggregate data records corresponding to the network elements, and aggregate data records corresponding to the charging nodes for reconciling data records of the same data session across all the multiple sources (i.e., Telecom Probes, Network nodes, and Charging nodes). The key for reconciling the same session across the above aggregation tables is the session's MSISDN along with a Charging ID (for 2G, 3G) and the session's MSISDN along with UEIP (for LTE). The result of this reconciliation stage is the generation of the three-way reconciliation record. It must be noted that the totals across all the sources for each MSISDN and Charging Id combination are reconciled in the three-way reconciliation record. Based upon the reconciliation output, the analytical platform 109 may calculate missing, underreported and overcharged data in the operator's charging system.

Specifically, the data aggregation and reconciliation module 207 may further provide the reconciled output to the data analytics module 209 for identifying the data gaps/discrepancies, the details of which are further explained in the subsequent paragraphs.

In one embodiment, the data aggregation and reconciliation module 207 may implement a three-way reconciliation process for reconciling the data records. It is to be noted that the telecom probe is the Primary, reliable, and independent source of data records, and therefore the aggregated data from the Data Extraction Platform (i.e. the telecom probe) is reconciled with the operators charging CDRs' data and Aggregated CDRs data obtained from network nodes. The aggregated data of the Data Extraction Platform, the network nodes, and the charging nodes for the derived event date is reconciled based on MSISDN and CHARGING_ID. The selection criteria for this first level reconciliation is all the aggregated data for a specified 'Event Date' for the telecom probe's data records, network node's data records and the charging node's data records. The matching criteria for this first level reconciliation is an Event Date, Charging Id, and MSISDN. The results of this three-way reconciliation are stored in a table within the data repository 210.

Based upon the reconciled data obtained for each parameter for each session, the data aggregation and reconciliation module 207 enables determining the presence or absence of the volume gap recorded for each session. For example, for the parameter APN as illustrated in FIG. 3, based on the reconciled data, if there is gap in capturing of usage volume by one of the multiple sources, then the data aggregation and reconciliation module 207 may determine that there is a presence of volume gap for the session corresponding to session-ID. Similarly, for each of the parameters captured from multiple sources, aggregation and reconciliation process is implemented to confirm the presence of the volume gap for each session depending on the volume gap identified for each parameter based on the reconciled volume usage data of each parameter. The results of the reconciliation are further provided to the data enrichment module 208 and the data analytics module 209 for performing data analytics with respect to anomalies detected in the usage volume and root-causes therefor, the details of which are hereinafter explained as below.

Data Enrichment Module 208

Referring now to FIG. 2, the data enrichment module 208 may further enable the analytical platform 109 to categorize each session into a predefined session category based upon the determination of the presence or absence of the volume gap. In one embodiment, the predefined session category is one of a matched session, a missing session, an under-reported session or an over-reported session. It must be understood that the matched session is a session present in the data records of each of the data sources including data Extraction Platform, the network node and the charging node and the captured volume at each of these data sources is matched. Further, the missing session is a session which is present in the data records of the data extraction platform but missing from the data records of the network node or the charging node (or both). Further, the underreported session is a session present in the data records of all the sources including the Data Extraction Platform, the network node and charging node but the volume reported in the data records of the network node or the charging node (or both) is lower than the volume reported by the data records of the Data Extraction Platform. Furthermore, the overreported session is a session present in the data records of all the sources including the Data Extraction Platform, the network node and charging node but the volume reported in the data records of the Data Extraction Platform is higher than the volume reported by the network node or the charging node (or both).

As illustrated in FIG. 3, at block 3, each of the session is categorized into the session category depending on determination of presence of volume gap corresponding to at least one of the parameter based upon the reconciled usage data obtained for the said parameter. For example, referring to FIG. 3, for the session with session ID-1, there is a volume gap identified corresponding to the parameter APN whereas there is no volume gap identified for other parameters corresponding to session ID-1, still the session with session ID-1 is categorized into the under-reported session category or the missing session category depending on the under-reported volume or missing volume reported from at least one of the sources corresponding to the parameter APN, as the case may be. Further, the data enrichment module 208 may tag the data records of each session with the predefined session category corresponding to the said session in order to obtain enriched data records for each session. For example, referring to FIG. 3, depending upon the session category assigned to each session, at blocks 8 and 9, the respective data records captured for the respective session are tagged with the respective session category to obtain enriched data records for the respective session.

In one example, table 5 below illustrates the results of aggregation, reconciliation and tagging of data records depicted in tables 2-4 pertaining to different sessions I, II and III. As can be seen from the table 5, the Session-I is depicted as "under reported" since the volume reported by the aggregated probe data records and the aggregated charging data records for the Session-I is 20971520 data units and 10484711 data units, respectively, thereby leading to a volume gap of 10486809 data units for the Session-I. Similarly, as shown in Table 5, the Session II and Session III are tagged as "underreported" and "matching" respectively based on the aggregation and reconciliation process.

TABLE 5

Tagging of sessions I, II and III into matched, missing, underreported, overreported based on aggregation & reconciliation results of data records of tables 2-4.

| Data Record attributes/parameters | Session-I | Session-II | Session-III |
|---|---|---|---|
| Session_Date | 2017 Dec. 1 | 2017 Dec. 1 | 2017 Dec. 1 |
| MSISDN | +911234567890 | +911234567891 | +911234598765 |
| CHARGING_ID | 98765 | 54321 | 98765 |
| Exists_in_Probe | Yes | Yes | Yes |
| Exists_in_Charging | Yes | Yes | Yes |
| APN | wap.telco.com | internet.telco.com | wap.telco.com |
| GGSN_IP_ADDRESS | 51.61.71.81 | 52.62.72.82 | 51.61.71.81 |

TABLE 5-continued

Tagging of sessions I, II and III into matched, missing, underreported, overreported based on aggregation & reconciliation results of data records of tables 2-4.

| Data Record attributes/parameters | Session-I | Session-II | Session-III |
|---|---|---|---|
| IMEI | 987654321012345 | 887456321054321 | 900654321068891 |
| TAC | 9876543 | 8874563 | 9006543 |
| VPLMN | 12345 | 34567 | 12345 |
| CHARGING_CHARACTGERISTIC | 400 | 500 | 400 |
| TOTAL_VOLUME_PROBE | 20971520 | 29360128 | 41943040 |
| TOTAL_VOLUME_CHARGING | 10484711 | 20971516 | 41943040 |
| VOLUME_GAP | 10486809 | 8388612 | 0 |
| SESSION_TAG | Under reported | Under reported | Matching |

It must be noted that the volume gap in terms of under-reported or over-reported or missing sessions is determined by performing parameter-wise aggregation and reconciliation analysis as illustrated in FIG. 3. As shown, block 2 enables aggregating the volumes captured corresponding to each parameter by each source to obtain aggregate volume corresponding to the said parameter. Further, at block 3, the aggregate volume is reconciled for each parameter across multiple sources. In one example, as shown at blocks 2-3, the usage volume for session ID-1 pertaining to parameter APN across the different sources is aggregated and reconciled to obtain reconciled usage data for the parameter APN. It is to be noted that the aggregation and reconciliation process as described above is applicable in order to perform parameter-wise aggregation and reconciliation analysis. The enriched data records may be processed by the data analytics module 209 in order to perform the data analytics on the enriched data records, the details of which are further explained hereinafter as below.

Data Analytics Module 209

Referring now to FIG. 2, the data analytics module 209 may further enable the analytical platform 109 to determine the actual volume gap and the probability of gap based upon the aggregation and reconciliation results obtained corresponding to each of the parameters across the multiple sources. The data analysis performed by the data analytics module 209 is two-fold. The first-level analysis is with respect to common parameters as illustrated in blocks 4-7 of FIG. 2. Whereas, the second-level analysis is with respect to all parameters (either common or uncommon), wherein the enriched data records are utilized to determine the volume gap and the probability of gap.

In the first-level analysis, the data analytics module 209 may initially determine total gap summary based upon volume gap identified from reconciled data of each parameter across multiple sources for the respective session. In one example, as shown in FIG. 3, at block 4, the data analytics module 209 may determine gap summary for the session-ID 1, session-ID 2 based upon the reconciled data obtained corresponding to each parameter across multiple sources at block 3. Further, at block 5, the data analytics module 209 may generate date-wise gap reports for each session identifying the total gap recorded for each session. Further, at block 5, the data analytics module 209 may determine total potential leakage in each session based upon the total gap recorded for each session.

Further, in the first-level analysis, the data analytics module 209 may perform analysis of volume gap and probability of gap for each parameter categorized as common parameter. The parameter-level analytics is performed in order to determine root-cause parameter for the volume gap detected and the probability of root-cause for the said parameter. The parameter-level analytics is performed as gap profiling for common parameters/dimensions as shown in block 6. Further, at block 7, root cause analysis for each common parameter is performed, wherein the total volume, total gap and the probability of root-cause for the gap for each common parameter is computed. The probability of gap is computed based upon division of the total gap and the total volume determined corresponding to each common parameter based upon the reconciled data obtained at block 3 for the said common parameter.

In the second-level analysis, the data analytics module 209 may aggregate the enriched data records of the multiple sources across the multiple parameters for each session. As illustrated in FIG. 3, at block 10, the enriched data records (tagged with session category) are aggregated across multiple sources. Further, at block 11, the aggregated enriched data records are processed to perform all parameter/dimensional (both common/uncommon parameters) level analysis in order to determine the volume gap and root-cause parameters for the volume gap recorded for the multiple sessions.

Based upon the aggregated data records for each session, the data analytics module 209 may further compute a total volume and a probability of gap root-cause corresponding to each parameter for detecting an anomaly in the data volume captured by each parameter. The data analytics module 209 may further be enabled to identify at least parameter of the multiple parameters as a root-cause parameter for the volume gap for each session based upon the probability of the gap root-cause computed corresponding to each parameter of the multiple parameters.

It is to be noted that the reconciliation may be performed at a session level to detect volume gaps among multiple sources. Further, it is extremely essential to establish or identify a root-cause for the gap to plug leakage. A limiting point in this step is availability of same sensitive parameters in all the data sources. Therefore, the data analytics module 209 performs the gap root-cause analysis step based upon profiling the volume gap by critical parameters captured in the Telecom probe data records. A gap probability by individual and combination of parameters is calculated resulting in guiding the root-cause analysis. The higher the probability, the more likely a parameter is causing gap.

In one embodiment, based upon the second-level analysis across all the parameters, the data analytics module may compute the total volume, volume from missing session, volume from under reported session and probability of session gap of each parameter. It must be noted that the probability of root cause may be calculated and reported by individual and combination of parameters as:

Probability of gap root-cause=(Volume from missing sessions+Volume from gap sessions)/Total volume Table 6 depicts the parameters considered to detect gap root-cause for aggregated data records corresponding to a session.

TABLE 6

Parameters considered for gap profiling and determining probability of gap

| Reconciliation | Object | Telecom Probe UDRs | Gap profile parameters | Probability of gap |
|---|---|---|---|---|
| Session gap Session A | Volume 109568 | Category Under re-ported | UDRs flagged with reconciliation category | Parameter (Y) APN Domain name Proxy IP address Protocol Sub-protocol Application RAT type TAC Network node VPLMN Cell ID | Parameter (Y) Total volume Volume from missing sessions Volume from under reported sessions Probability % of parameter causing gap |

As shown in FIG. 3, for each of the parameters (Viz. APN, URL etc.) the total volume captured corresponding to multiple sessions, volume from missing sessions, volume from under-reported sessions is determined. Thereafter, the probability of root-cause for the gap of each parameter is computed to identify the root-cause parameters resulting in the volume gap in the multiple sessions.

Referring to FIG. 4, in the reporting stage 405, the analytical platform 109 may generate one or more revenue assurance reports 110 that are displayed to the users for identifying data discrepancies and thereby determining revenue leakages. The data is stored in a format that can be readily consumed to generate the reports using various visualization tools and graphic user interfaces. The revenue assurance reports 110 generated may provide visualized information depicting volume discrepancies, number of sessions, and number of subscribers in each of the above categories (i.e. missing, matching, under reporting and over reporting) are further analyzed for revenue assurance reporting purposes. In an aspect, the revenue assurance report may include information related to attributes such as one or more of a volume gap corresponding to one or more sessions, a total volume gap, a total data volume captured, total number of sessions, estimate revenue leakage, total number of subscribers contributing to revenue leakage, top Access Point Names contributing to revenue leakage, top Uniform Resource Locators contributing to revenue leakage, top Applications contributing to revenue leakage, Hourly trend of network traffic, Hourly trend of revenue leakage, Protocol, Proxy IP addresses, User location, Destination IP address, Charging characteristic, a total revenue leakage corresponding to the at least one parameter identified as the root-cause parameter, and the like.

In an embodiment, the DPI (deep packet inspection capability) of the analytical platform 109 may enable generating additional business insights including but not limited to total data volume captured, total number of sessions, total number of subscribers, top 20 APNs, top 20 URLs, top 20 applications used in operator's network, and hourly trend of network traffic.

In an example implementation of the described methods and systems, a Deep Packet Inspection (DPI) Probe was setup to independently validate the completeness of charging of data session in a Charging Control Node (CCN). A reconciliation between DPI Probe and CCN data records was performed for data transactions pertaining to a predetermined time interval (e.g. say entire day). Reconciliation revealed that the data captured via the DPI Probe was greater than the data captured via the CCN. Further analysis indicated that certain subscribers fraudulently modified domain name of various URLs being accessed to a domain that was not configured to trigger CCN for airtime depletion by the telecom operator and were able to browse the internet for free. This fraudulent bypass allowed the subscribers to surf the internet without a corresponding depletion of main or dedicated account balance leading to a loss in revenues. In a single instance, it was observed that a subscriber had performed downloads and uploads cumulative to 4.2 GB as captured by the DPI Probe against a charged volume in CCN of 2.1 KB clearly indicating a fraudulent activity.

In accordance with various aspects of the present disclosure, the described system and method for detecting anomalies in recorded consumption of data in a communication network may be implemented, but not limited to following use cases.

In one exemplary embodiment, the described system may be used for detecting abusing of the policy services by the corporate users. For example, the corporate users may be using personal/banned/restrictive services (such as Torrent or porn websites on enterprise APNs that are discounted) thereby abusing the service contract. The system of the present disclosure may indicate the usage of such personal/banned/restrictive services as bandwidth reselling and thereby alert the relevant personal. In another example of the abusing of the policy services, the system may enable in detection of the restricted operator portal gateway IP's being used for other domains. For example, the system may locate and/or identify the Reverse Proxy IP for WAP portal in external websites and for external application usages.

In another exemplary embodiment, the system of the present disclosure may enable in VPN bypass detection. For example, third party applications like Psiphon (accessed through Opera Mini, Psiphon browser) may allow VPN based routing of traffic, and settings in the policy control functions may allow this usage to bypass the charging system. The present system may enable in detection of such bypass of the charging system.

In yet another exemplary embodiment, the system may enable outlier usage profiling wherein abnormal/high risk usage may be profiled to ascertain risk associated with the MSISDN. For example, in case the DNS traffic >40% of the total usage, the system may refer the specific pattern of protocols being used to SIM box numbers.

In yet another exemplary embodiment, the system may independently validate usage of certain protocols and/or applications, controlled by DPI systems in Policy and Charging Control (PCC) systems, which otherwise cannot be detected.

In yet another exemplary embodiment, the system may enable profiling of gaps. Specifically, the system may enable profiling of network to charging volume difference to determine a specific protocol, an application, a proxy address, and domain name that may cause the gap. For example, the system may enable to profile usage over '127.0.0.1' proxy having 80% probability of not getting charged.

In yet another exemplary embodiment, the system may enable detection of CDR failure/suppression at a network. Specifically, the system may validate suppression/bypass rules at network nodes by independently probing records traffic of GGSN/EPG CDRs. For example, the system may validate the suppression/bypass rules for CDRs not generated for M2M traffic over corp. ABC APN. In another example, the system may detect, using an independent DPI probe, a root cause for volume difference between GGSN and charging due to mishandling at Policy control enforcing function (PCEF) gateway.

In yet another exemplary embodiment, the system may validate, using the DPI probe, recording and rounding off a volume captured in the communication network. The volume recording in GGSN is considered as a standard for Network billing purposes.

In yet another exemplary embodiment, the system may enable validation of a SIM box for abnormal usage. Specifically, the system may analyze MSISDN from the SIM box for abnormal machine-like usage in contrast to conventional methods/systems which restricts the SIM box analysis to detect the circuit switched usage. For example, the system may enable analysis of SIM box configured with automated browsing of URL-xyz and protocol 'abc' only.

In still another exemplary embodiment, the system may enable monitoring usage of data from blacklisted users/ subscribers. Specifically, the system may thoroughly analyze the parameters depicting usage from suspicious subscribers. For example, the system may enable monitoring/ tracking of a destination server IP/PABX being accessed for a brute-force attack.

Although implementations for method and system for detecting anomalies in recorded consumption of data in a communication network have been described in language specific to structural features and/or methods, it is to be understood that the appended claims are not necessarily limited to the specific features or methods described. Rather, the specific features and methods are disclosed as examples of implementations for detecting anomalies in recorded consumption of data in a communication network.

The invention claimed is:

1. A method for detecting anomalies in recorded consumption of data in a communication network, the method comprising:
    extracting, by a processor, a plurality of data records from a plurality of data sources for each session in the communication network, wherein the plurality of data sources include at least a data extraction platform communicatively coupled to one or more controlling interfaces of the communication network for extracting a data record of the plurality of data records, and wherein the plurality of data records comprise one or more parameters indicating usage volume pertaining to one or more services being consumed for each session;
    aggregating, by the processor, the usage volume captured in the plurality of data records in order to obtain an aggregate usage volume corresponding to each data source for each session;
    reconciling, by the processor, the aggregate usage volumes corresponding to each data source for each session in order to determine either presence or absence of a volume gap in each session;
    categorizing, by the processor, each session into a session category based upon the determination of either presence or absence of the volume gap;
    tagging, by the processor, the data records of a session with a session category corresponding to the session in order to obtain enriched data records for each session;
    aggregating, by the processor, the enriched data records from the multiple data sources across the multiple parameters for each session;
    computing, by the processor, a total volume and a probability of gap root-cause corresponding to each parameter for detecting an anomaly in the data volume captured by each parameter, wherein the total volume and the probability of gap root-cause is computed for each parameter based upon the enriched data records aggregated for each session; and
    identifying at least one parameter amongst the multiple parameters as a root-cause parameter for the volume gap for each session based upon the probability of the gap root-cause computed corresponding to each parameter of the multiple parameters.

2. The method of claim 1, wherein the plurality of data sources further comprises one or more network nodes, a charging node and a policy controlling node, and wherein the one or more controlling interfaces comprises traffic interfaces or gateways.

3. The method of claim 2 further comprising normalizing, by the processor, the plurality of data records to generate normalized data records using an extraction, transforming and loading framework.

4. The method of claim 1, wherein the usage volume of sessions is aggregated at a level selected from at least one of an IP-CAN session level, a bearer level and a service data flow level.

5. The method of claim 1, wherein the session category is one of a matching session, a missing session, an under-reported session and an over-reported session.

6. The method of claim 1, wherein the multiple parameters comprise access point name, domain name, proxy IP address, protocol, sub-protocol, application, radio access technology type, type allocation code, network node, visited public land mobile network and cell ID.

7. The method of claim 1, wherein the probability of gap root-cause for a parameter is computed based upon the total volume and the volume gap from one or more sessions with a category corresponding to either of the missing session, an under-reported session and over-reported session computed corresponding to the said parameter.

8. The method of claim 7, wherein the gap volume for one or more sessions is at least one of a missing volume, an under-reported volume and an over-reported volume.

9. The method of claim 1 further comprising generating a report depicting one or more of a volume gap corresponding to one or more sessions, a total volume gap, a total data volume captured, total number of sessions, estimate revenue leakage, total number of subscribers contributing to revenue leakage, top access point names contributing to revenue leakage, top uniform resource locators contributing to revenue leakage, top applications contributing to revenue leakage, hourly trend of network traffic, hourly trend of revenue leakage, protocol, proxy IP addresses, user location, destination IP address, charging characteristic, and a total revenue leakage corresponding to the at least one parameter identified as the root-cause parameter.

10. A system for detecting anomalies in recorded consumption of data in a communication network, the system comprising:

a processor; and
a memory coupled with the processor, wherein the processor executes a plurality of modules stored in the memory, the plurality of modules comprising:
   a data capturing module for
      capturing a plurality of data records from a plurality of data sources for each session in a communication network, wherein the plurality of data sources include at least a data extraction platform communicatively coupled to one or more controlling interfaces of the communication network for extracting a data record of the plurality of data records, and wherein the plurality of data records comprise one or more parameters indicating usage volume pertaining to one or more services being consumed for each session;
   a data aggregation and reconciliation module for
      aggregating the usage volume captured in the plurality of data records in order to obtain an aggregate usage volume corresponding to each data source for each session, and
      reconciling the aggregate usage volumes corresponding to each data source in order to determine either presence or absence of volume gap for each session;
   a data enrichment module for
      categorizing each session into a predefined session category based upon the determination of either presence or absence of the volume gap, and
      tagging the data records of a session with the predefined session category corresponding to the session in order to obtain enriched data records for each session; and
   a data analytics module for
      aggregating the enriched data records from the multiple data sources across the multiple parameters for each session,
      computing a total volume and a probability of gap root-cause corresponding to each parameter for detecting an anomaly in the data volume captured by each parameter, wherein the total volume and the probability of gap root-cause is computed for each parameter based upon the enriched data records aggregated for each session, and
      identifying at least one parameter amongst the multiple parameters as a root-cause parameter for the volume gap for each session based upon the probability of the gap root-cause computed corresponding to each parameter of the multiple parameters.

11. The system of claim 10, wherein the plurality of data sources further comprises one or more network nodes, a charging node and a policy controlling node, and wherein the one or more controlling interfaces comprises traffic interfaces or gateways.

12. The system of claim 11, wherein the data records extracted using the data extraction platform, the network nodes and the charging node are normalized using an extraction, transforming and loading framework.

13. The system of claim 9, wherein the data analytics module is configured for generating a report depicting one or more of a volume gap corresponding to one or more sessions, a total volume gap, a total data volume captured, total number of sessions, estimate revenue leakage, total number of subscribers contributing to revenue leakage, top access point names contributing to revenue leakage, top uniform resource locators contributing to revenue leakage, top applications contributing to revenue leakage, hourly trend of network traffic, hourly trend of revenue leakage, protocol, proxy IP addresses, user location, destination IP address, charging characteristic, and a total revenue leakage corresponding to the at least one parameter identified as the root-cause parameter.

14. A non-transitory computer readable medium storing program for detecting anomalies in recorded consumption of data in a communication network, the program comprising instructions for:
   extracting a plurality of data records from a plurality of data sources for each session in the communication network, wherein the plurality of data sources include at least a data extraction platform communicatively coupled to one or more controlling interfaces of the communication network for extracting a data record of the plurality of data records, and wherein the plurality of data records comprise one or more parameters indicating usage volume pertaining to one or more services being consumed for each session;
   aggregating the usage volume captured in the plurality of data records in order to obtain an aggregate usage volume corresponding to each data source for each session;
   reconciling the aggregate usage volumes corresponding to each data source in order to determine either presence or absence of volume gap for each session;
   categorizing each session into a session category based upon the determination of either presence or absence of the volume gap;
   tagging the data records of a session with the predefined session category corresponding session in order to obtain enriched data records for each session;
   aggregating the enriched data records from the multiple data sources across the multiple parameters for each session;
   computing a total volume and a probability of gap root-cause corresponding to each parameter for detecting an anomaly in the data volume captured by each parameter, wherein the total volume and the probability of gap root-cause is computed for each parameter based upon the enriched data records aggregated for each session; and
   identifying at least one parameter amongst the multiple parameters as a root-cause parameter for the volume gap for each session based upon the probability of the gap root-cause cause computed corresponding to each parameter of the multiple parameter.

* * * * *